United States Patent
Jayan et al.

(10) Patent No.: US 10,977,671 B2
(45) Date of Patent: Apr. 13, 2021

(54) ITEM LEVEL 3D LOCALIZATION AND IMAGING USING RADIO FREQUENCY WAVES

(71) Applicant: Punchh Inc., San Mateo, CA (US)

(72) Inventors: Vivek Jayan, Redwood City, CA (US); Andrew McElroy, San Jose, CA (US); Kumar Ujjwal, Palo Alto, CA (US)

(73) Assignee: PUNCHH INC., San Mateo, CA (US)

( * ) Notice: Subject to any disclaimer, the term of this patent is extended or adjusted under 35 U.S.C. 154(b) by 0 days.

(21) Appl. No.: 16/525,391

(22) Filed: Jul. 29, 2019

(65) Prior Publication Data

US 2020/0126097 A1    Apr. 23, 2020

Related U.S. Application Data

(60) Provisional application No. 62/748,299, filed on Oct. 19, 2018.

(51) Int. Cl.
  *G06Q 30/02* (2012.01)
  *G06F 16/9535* (2019.01)
  (Continued)

(52) U.S. Cl.
  CPC .......... *G06Q 30/0201* (2013.01); *G01S 7/412* (2013.01); *G01S 13/89* (2013.01);
  (Continued)

(58) Field of Classification Search
  USPC .......................................................... 705/7.29
  See application file for complete search history.

(56) References Cited

U.S. PATENT DOCUMENTS

| 6,057,761 A * | 5/2000 | Yukl ..................... A61B 5/0507 250/358.1 |
| 2013/0022238 A1* | 1/2013 | Wood ....................... G06K 5/00 382/103 |

(Continued)

FOREIGN PATENT DOCUMENTS

| EP | 3 196 810 A1 | 7/2017 |
| GB | 2 561 275 A | 10/2018 |

OTHER PUBLICATIONS

L. Liu, B. Zhou, Z. Zou, S. Yeh and L. Zheng, "A Smart Unstaffed Retail Shop Based on Artificial Intelligence and IoT," 2018 IEEE 23rd International Workshop on Computer Aided Modeling and Design of Communication Links and Networks (CAMAD), Barcelona, 2018, pp. 1-4, doi: 10.1109/CAMAD.2018.8514988 (Year: 2018).*

(Continued)

*Primary Examiner* — Folashade Anderson
(74) *Attorney, Agent, or Firm* — Fenwick & West LLP (57) ABSTRACT

A system and a method are disclosed for tracking user activity with products in an environment. In an embodiment, a processor detects that a user has entered an environment, and responsively uniquely identifies the user. The processor determines that the user interacts with a product of a plurality of products within the environment, and responsively updates a profile of the user with indicia of the product. The processor determines whether the user is attempting to exit the environment, and, in response to determining that the user is attempting to exit the environment, prompts the user to confirm that the user intends to remove the product from the environment based on the updated profile. The processor receives input from the user confirming that the user intends to remove the product from (Continued)

the environment, and responsively further updates the profile based on the input.

20 Claims, 5 Drawing Sheets

(51) Int. Cl.
    *G06F 16/23*     (2019.01)
    *G01S 13/89*     (2006.01)
    *H04L 29/08*     (2006.01)
    *G01S 7/41*     (2006.01)

(52) U.S. Cl.
    CPC ...... *G06F 16/2379* (2019.01); *G06F 16/9535* (2019.01); *H04L 67/26* (2013.01); *H04L 67/306* (2013.01)

(56) References Cited

U.S. PATENT DOCUMENTS

| | | | | |
|---|---|---|---|---|
| 2013/0238471 | A1* | 9/2013 | Maraz | G06Q 10/087 705/28 |
| 2014/0324615 | A1* | 10/2014 | Kulkarni | G06Q 30/02 705/26.1 |
| 2014/0334653 | A1* | 11/2014 | Luna | H05B 47/105 381/332 |
| 2015/0012396 | A1* | 1/2015 | Puerini | G06K 9/00771 705/28 |
| 2016/0078484 | A1* | 3/2016 | Emigh | G01S 1/72 705/14.58 |
| 2016/0110786 | A1* | 4/2016 | Herring | H04N 5/232 705/26.35 |
| 2017/0011423 | A1* | 1/2017 | Douglas | G06Q 30/0261 |
| 2018/0096567 | A1* | 4/2018 | Farrow | G06Q 20/4016 |
| 2018/0146334 | A1* | 5/2018 | Wootton | H04B 17/373 |
| 2018/0240088 | A1* | 8/2018 | Nelms | G06Q 20/20 |
| 2018/0240180 | A1* | 8/2018 | Glaser | G06K 9/00771 |
| 2019/0246963 | A1* | 8/2019 | Chung | A61B 5/4875 |

OTHER PUBLICATIONS

P. Chandrasekar and T. Sangeetha, "Smart shopping cart with automatic billing system through RFID and ZigBee," International Conference on Information Communication and Embedded Systems (ICICES2014), Chennai, 2014, pp. 1-4, doi: 10.1109/ICICES.2014.7033996 (Year: 2014).*

Ankush Yewatkar, Faiz Inanndar, Raj Singh, Ayushya, Amol Bandal, Smart Cart with Automatic Billing, Product Information, Product Recommendation Using RFID & Zigbee with Anti-Theft, Procedia Computer Science, vol. 79, 2016, pp. 793-800, ISSN 1877-0509, (Year: 2016).*

Tan, S. (2019). Towards ubiquitous sensing using commodity WiFi (Order No. 10976091). Available from ProQuest Dissertations and Theses Professional. (2272213353). Retrieved from https://dialog.proquest.com/professional/docview/2272213353?accountid=131444 (Year: 2019).*

PCT International Search Report and Written Opinion, PCT Application No. PCT/US19/55628, dated Jan. 10, 2020, 14 pages.

* cited by examiner

ITEM LEVEL 3D LOCALIZATION AND IMAGING USING RADIO FREQUENCY WAVES

CROSS REFERENCE TO RELATED APPLICATIONS

This application claims the benefit of U.S. Provisional Application No. 62/748,299, filed Oct. 19, 2018, the disclosure of which is hereby incorporated by reference herein in its entirety.

TECHNICAL FIELD

The disclosure generally relates to the field of three-dimensional localization and imaging, as specifically applied to a process for monitoring users and tangible items with which the users interact.

BACKGROUND

Related art systems monitor users and tangible items (e.g., in a retail store environment) through a complex system of Quick Response (QR) codes, computer vision, and custom hardware (including deployment of both emitters and receivers). Beyond being expensive and labor-intensive to implement, such related art systems do not provide full imaging of a three-dimensional environment, at least because these systems are limited to a line-of-sight of computer vision sensors.

SUMMARY

Systems and methods are described herein that provide a full imaging of a three-dimensional ("3D") environment. The full imaging is made possible by implementation of a system that can image through walls and other opaque objects that break a line of sight. Specifically, the systems and methods disclosed herein include deploying signal receivers that receive signals emanating from, e.g., WiFi access points, mobile phones, and the like. A processor synthesizes the signals received by the receivers to image items and persons in, e.g., a store environment. As items or persons relocate through the environment, the processor detects changes in the image based on changes in signal characteristics, such as absorption, refraction, and/or reflectance caused by those items and persons, and is thus able to monitor and track the changes throughout the environment, notwithstanding potential obstructions to a line of sight between the receivers and the items and persons.

In an example embodiment, a processor detects that a user has entered an environment, and responsively uniquely identifies the user (e.g., based on signal absorption characteristics by the user, indicating height, clothing, etc. of the user). The processor determines that the user interacts with a product of a plurality of products within the environment (e.g., based on determining that the user removes a product from a shelf based on absorption patterns of the user and the product over time as the user moves), and responsively updates a profile of the user with indicia of the product (e.g., indicating that the product is in a shopping cart or basket of the user). The processor determines whether the user is attempting to exit the environment, and, in response to determining that the user is attempting to exit the environment, prompts the user to confirm that the user intends to remove the product from the environment based on the updated profile (e.g., by prompting the user at a kiosk or using a mobile device application). The processor receives input from the user confirming that the user intends to remove the product from the environment, and responsively further updates the profile based on the input.

BRIEF DESCRIPTION OF DRAWINGS

The disclosed embodiments have other advantages and features which will be more readily apparent from the detailed description, the appended claims, and the accompanying figures (or drawings). A brief introduction of the figures is below.

DETAILED DESCRIPTION

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Configuration Overview

Figure 1:
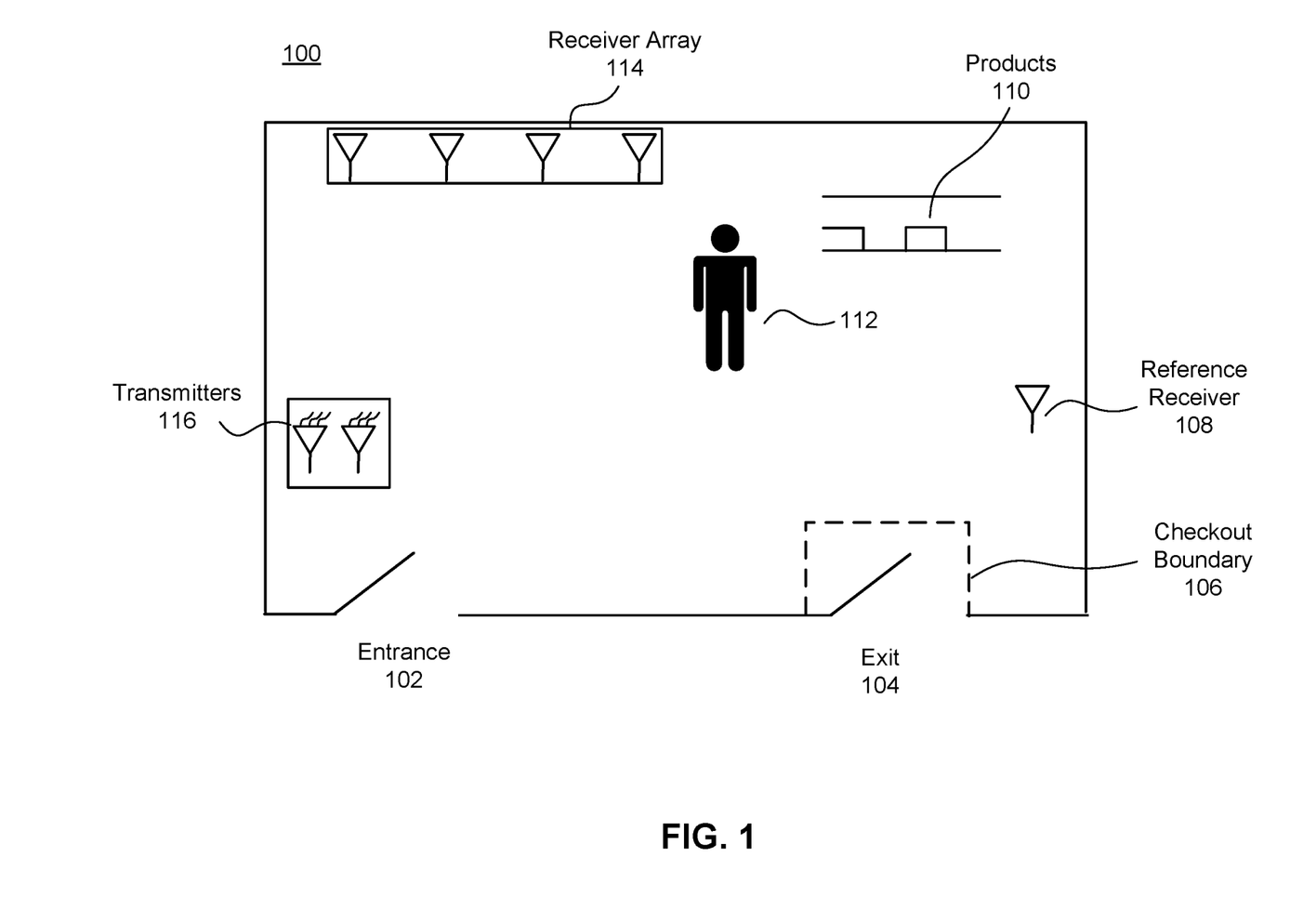
FIG. 1 illustrates one embodiment of an environment where persons and items are tracked by way of three-dimensional imaging derived from signal receivers.

One embodiment of a disclosed system, method and computer readable storage medium that includes three-dimensional localization and imaging techniques uses radio frequency waves to perform the localization and imaging in, e.g., a retail store environment. FIG. 1 illustrates one embodiment of an environment where persons and items are tracked by way of three-dimensional imaging derived from signal receivers. Environment 100 is any environment where persons and/or items are to be tracked or monitored. Environment 100 is often described herein as a retail store environment, but this description is merely illustrative; any environment including persons or tangible items is within the scope of environment 100.

Transmitters 116 transmit signals throughout environment 100. Transmitters 116 may include transmitters located anywhere within, or within signal range of, environment 100. Transmitters 116 may be installed within, or near, environment 100 for the purpose of tracking items and/or persons within environment 100. Alternatively, transmitters 116 are, or include, transmitters used for purposes other than tracking items and/or persons within environment 100. For example, transmitters 116 may include transmitters from devices carried by persons within environment 100 (e.g., a smart phone device carried by person 112), permanent or semi-permanent devices installed within environment 100 (e.g. a wireless Internet router or gateway intended to provide WiFi access to persons within environment 100), and any other transmitter that produces signals that are detected by receivers of receiver array 114.

Receiver array 114 includes receivers that detect signals from transmitters 116. While receiver array 114 is depicted as a plurality of receivers that are clustered in one location in environment 100, the receivers may be scattered throughout, or outside of, but in the vicinity of, environment 100. The receivers of receiver array 114 relay detected signals to a processor, which processes the data (as described in further detail below) and synthesizes image and localization data therefrom. Optionally, a reference receiver 108 is positioned at a known location within environment 100. Reference receiver 108 is used to calibrate the receivers of receiver array 114 to simplify, and ensure accuracy of, the image and localization data. In an embodiment, reference receiver 108 is calibrated by placing reference receiver 108 at a known distance from transmitters 116. In another embodiment, reference receiver 108 is calibrated by way of a Received Signal Strength Indicator (RSSI) calculation, which is used to approximate the distance of reference receiver 108 from transmitters 116. Reference receiver 108, after being calibrated, may be used as a baseline or correction signal for transmitters 116. For example, signals from transmitters 116 may be divided by a reference signal received by reference receiver 108 to calibrate and/or normalize the signals from transmitters 116. Reference receiver 108 may be periodically recalibrated to maintain accuracy as environment 100 may undergo changes over time. The receivers of receiver array 114, and reference receiver 108, may be configured to limit detection to, or limit relaying for imaging/localization purposes to the processor, signals of a predetermined channel or frequency, or sub-part thereof. The processor is configured to treat the waveforms in a manner similar to light, where the processor creates a visual mapping based on where and how the signals bands detected by the receivers coalesce. The coalescence of the signal bands depends on how the signals are absorbed, reflected, refracted, and otherwise manipulated by properties of the products and persons (described further below).

The processor may determine a measure of absorption in environment 100 by tracking an amount of signal emitted by a transmitter at any given time, and determining how much of that signal was again detected back at transmitters 116 and/or receiver array 114 and/or reference receiver 108. Based on these tracked parameters, the processor may determine an absorption rate of any given emitted waveform. The processor may infer characteristics about the medium any given waveform hits based on known mappings of absorption rate of a waveform type to a medium. For example, the processor may reference a database whose entries indicate that a waveform absorption rate of X correlates to a medium the waveform hits being a liquid, or a solid, or having a certain level of density, or having a certain color attribute, etc.

The processor may also determine refraction properties of mediums hit by waveforms by measuring phase shift, deflections, and other impacts to an expected path of signals transmitted by transmitters 116 before reaching reference receiver 108. The processor may determine, based on the refraction properties, geometry of a medium hit by a given waveform. Such refraction properties may also indicate physical properties of the waveform, such as those described immediately above with respect to absorption measurement. The processor may perform these determinations by observing refraction properties, such as deflection, phase shift, etc., and then referencing a database that maps the properties, as well as waveform properties, to geometry and/or physical properties. The processor may also use reraction properties to track speed of different objects using, e.g., doppler. For example, if the processor detects that a phase shift is greater at receiver of receiver array 114 than at a transmitter of transmitters 116, the processor may determine (e.g., based on the database entries) that an individual is running through environment 100.

The processor may also determine reflectance properties of mediums hit by waveforms. Reflectance properties refer to properties that indicate how a material reflects certain waveforms. These properties may enable the processor to infer color (e.g., because some colors reflect radio waveforms, while others do not). Reflectance properties may also enable the processor to infer material properties (e.g., metals will reflect at a higher rate, so a high reflectance may indicate a material is a metal). Further, reflectance may enable the processor to identify anomalies and potential errors. For example, a high level of reflectance could indicate that someone is trying to steal products from environment 100 by blocking wireless waveforms using a highly reflective material to shield his or her nefarious activities.

A database may correlate absorption, refraction, and reflection properties. Such a database may indicate correlations separately for persons and products, where entries may indicate that where absorption, refraction, and/or reflection properties that are detected together for a given waveform indicate certain characteristics of persons and/or products. Such a database may correlate these characteristics to patterns of one or more signals, a pattern referring to a combination of characteristics (e.g., absorption, refraction, and/or reflection characteristics). In an embodiment, rather than use database correlations, a model (e.g., machine learning model, such as a neural network) may be trained to accept absorption, refraction, and or reflection properties as inputs, and may output based on those inputs a likely identification or attribute of an object or person.

3D Localization and Imaging of Products and Customers Using Signal Waves

Following the example embodiment where environment 100 is a retail store environment, a processor of a server that performs 3D localization and imaging of environment 100 may detect person 112 entering environment 100 by way of entrance 102. The processor may detect the entry of person 112 by determining that an entity has crossed the plane of entrance 102, and by determining based on an imaging of the entity (e.g., based on absorption, refraction, and or reflectance properties as compared to a database), that the entity is a human being. The processor may generate a signature of person 112 based on observed signal patterns corresponding to uniquely identifiable features of a person 112. For example, the signal patterns for generating the unique signature may be dependent on signal characteristics, such as absorption, refraction, and/or reflection corresponding to unique characteristics of the person (e.g., height, size, and clothing characteristics detected by way of imaging the entity). The unique signature is stored in a database within a memory (e.g., a long term non-transitory storage device). Further, the unique signature may include a unique identifier or may be hashed to generate a unique identifier. Based on this signature, the processor may track movement of person 112 as person 112 moves through environment 100, all the while maintaining knowledge that the tracked person is person 112 because these characteristics of person 112 remain constant.

The processor may additionally positively identify person 112 when person 112 enters environment 100 through entrance 102. In an embodiment, the processor generates a signature for the person 112 entering the store. The signature is compared to stored signatures in the database. If a match is found in the database for the signature, profile data corresponding to person 112 (profile data and management thereof is discussed below with respect to FIG. 3) is retrieved. In some embodiments, the processor may detect not only person 112, but a mobile device carried by person 112. Based on the location of the mobile device, or based on unique attributes of a signal itself, the processor is able to detect that a particular signal is from the mobile device of person 112. The processor may then determine an identity of the person based on identifying information embedded in the signal. For example, if the mobile device has an app installed that is designed to communicate with environment 100 (e.g., the app described above and below herein), the app itself may cause the mobile device to emit a signal that identifies person 112. In some embodiments, computer vision may be used to determine or verify an identity of person 112. The profile of a user may indicate an address of a mobile device of the user.

If the signature is not known, a record for person 112 may be created to store the signature, which may be stored in an entry of a database. The stored signature may be given an identifier so that additional information corresponding to person 112 can be added to the record with the signature as such information is received. For example, if the signature of person 112 is unknown to the server, person 112 is prompted to enter identifying information, and the identifying information is added to the record with the signature. As another example, observed actions of person 112 (e.g., purchasing habits) may be stored in the record with the signature (e.g., and the identifier) such that, notwithstanding that person 112 is anonymous.

In an example embodiment, entry of such identifying information may be a precondition to proceed past a barrier at, or just past, entrance 102 of environment 100. The prompt may occur on a personal device carried by person 112 (e.g., by way of an app required to be installed on the personal device as a precondition to enter environment 100), or may occur on a kiosk at or near entrance 102. The identifying information may, for example, include information sufficient to invoice (or bill) person 112 for any products 110 person 112 removes from environment 100. The prompt may be satisfied by person 112 scanning or displaying a QR code, to be scanned within environment 100, that provides identifying information and/or invoice information to the processor. In some embodiments, person 112 is prompted to identify themselves at each entry of environment 100. In other embodiments, after a signature of person 112 is known to the processor, person 112 need not identify themselves at future entries to environment 100.

Beyond tracking the identity and movements of person 112, the processor also tracks the identity and movement of one or more products 110. In some embodiments, products 110 may be identified based on a unique detectable signal pattern for the object. The signal pattern may, in part, be based upon characteristics (e.g., absorption, refraction, and/or reflectance characteristics) of the object. For example, physical characteristics of products 110 cause the signals of transmitters 116 to be absorbed, reflected, refracted, and to otherwise wrap around products 110 in unique manners. The processor may be able to identify a given product based on such unique characteristics.

There may be times where the processor is unable to identify two distinct products of products 110 based on imaging the products using their unique characteristics. For example, cans of vegetables such as green beans or peas, or boxes of cereal, may have identical, or near-identical images, and may thus be mistakenly determined by the processor to be identical products. In some cases, this mistaken identity may be avoided by detecting minor differences in the characteristics of these products. For example, the processor may detect that the signals permeated different cans of food differently based on the characteristics of the food, or may detect that the signals were absorbed slightly differently based on different coloring schemes of boxes or labels. In other cases, or in addition, this mistaken identity may be avoided by pre-mapping locations in environment 100 where each given product 110 sits, so that the processor knows, based on the location from which a product 110 was taken, perhaps in conjunction with unique characteristics of that product, which of two similarly-imaged products it is.

In some embodiments, the processor of the server may differentiate different ones of products 110 by analyzing absorption properties of features encoded onto packaging of the products 110. For example, coded ink (e.g., QR codes, bar codes, serial numbering, or any other form of unique identifier) or other radio-opaque markers may be embedded on product packaging, and may be detected by the processor on a given product 110, where the ink (or radio-opaque marker) has a property of having a high absorption rate of the signals transmitted by transmitters 116. The processor may detect the ink by, when generating an image of environment 100, including in the image the codes themselves on the products themselves by imaging the product in a manner that factors in the ink. The processor may compare symbols (e.g., words, text, bar codes, QR codes, and the like) to entries of a database that maps the symbols to known products, and may, based on the comparison, determine an identity of a given product.

As a further embodiment for identifying products, additional physical characteristics of products 110 may be determined using additional sensors. For example, person 112 may be carrying a container (e.g., a shopping basket) with a weight sensor where, when a product of products 110 is added that might be one of two or more candidate products, a weight of the product is computed. The processor may receive the weight, and may determine the identity of the product based on its weight matching an entry in a database corresponding to only one of the two or more candidate products (e.g., in addition to considering other factors described herein, such as unique characteristics of the image, etc.).

In a store environment, when a person (e.g., person 112) is exiting environment 100, the processor determines which ones of products 110 the person is carrying, and updates records (discussed below with respect to FIGS. 2-3) accordingly. The processor may determine that person 112 is exiting environment 100 when person 112 enters a checkout boundary 106, or when person 112 crosses a plane of exit 104. In some embodiments, the processor tracks person 112 from a time at which person 112 enters environment 100, until person 112 exits environment 112, and additionally tracks what products 110 person 112 has taken over that period of time. The processor updates its records (e.g., indicating a purchase) that person 112 has acquired each taken product of products 110 when the person exits environment 100.

In other embodiments, the processor causes a prompt to be displayed to person 112, the prompt requesting that person 112 confirm he would like to acquire or purchase the products 110 that they have taken. The prompt may be generated for display at a kiosk within checkout boundary 106, or, the processor may cause the prompt to generate for display on a mobile device carried by person 112 in response to determining that person 112 has entered checkout boundary 106 (e.g., addressing the prompt to the user's mobile device based on profile information indicating the mobile device address). The prompt may include a selectable option that person 112 may select to confirm a purchase, and may include an itemized list of taken products. Additionally, or alternatively, the prompt may include a QR code that person 112 may scan to confirm the checkout. Environment 100 may have a barrier at exit 104, and the processor may de-activate the barrier, allowing person 112 to exit environment 100 through exit 104, in response to person 112 confirming the checkout.

The processor may determine that person 112 would like to revise what products 110 he would like to take or purchase. For example, following from the embodiment above, the processor may receive input from person 112 that he or she would like to remove a given product that he or she had taken from items to be removed from environment 100. In another embodiment, the processor may determine that person 112 has not confirmed the checkout after entering checkout boundary 106, and instead has exited checkout boundary 106 back toward the remainder of environment 100. In response to detecting that the user has re-entered the remainder of environment 100, the processor may remove the prompt from whatever device the processor caused the prompt to be displayed on, and may resume monitoring what products 110 are taken, or placed back, by user 112. Thus, when the processor determines that person 112 has re-entered checkout boundary 106, the processor may cause a new prompt to display for person 112 to use to check out.

System Architecture

Figure 2:
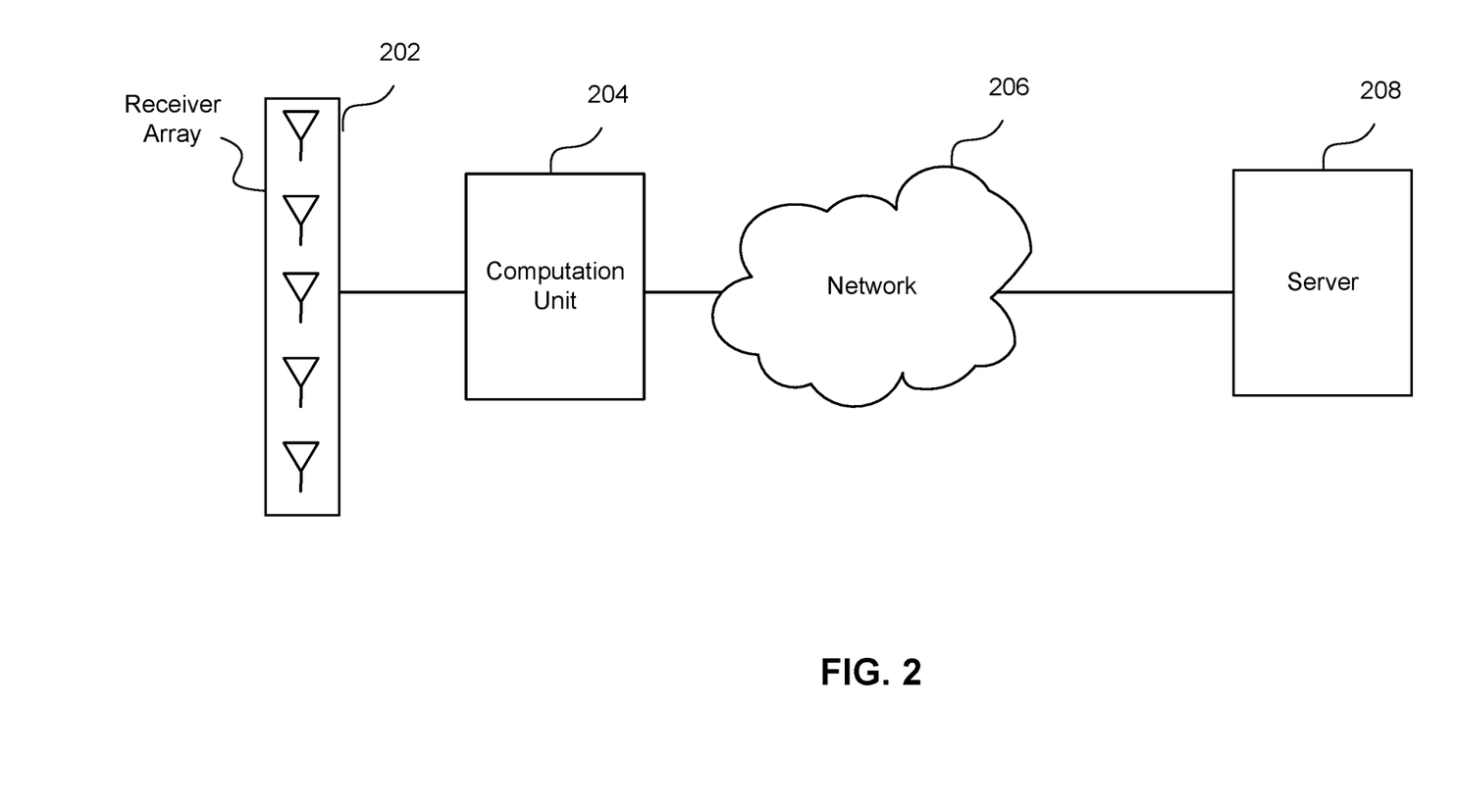
FIG. 2 illustrates one embodiment of a system architecture for processing data derived from signal receivers.

FIG. 2 illustrates one embodiment of a system architecture for processing data derived from signal receivers. Receiver array 202 collects received signal data and transmits the data to computation unit 204. Receiver array 202 has the same functionality as receiver array 114, described above with respect to FIG. 1. In an embodiment, computation unit 204 is on the same side of network 206 as receiver array 202, and computation unit 204 synthesizes the data received from each receiver of receiver array 202 prior to transmitting the synthesized data to server 208. The synthesized data may include raw data to be used by a processor of server 208 to generate an image of environment 100, or may alternatively be the image itself. In an alternate embodiment, some or all of computation unit 204 is implemented within server 208 (e.g., as the aforementioned processor of server 208), in which case raw, or partially synthesized data from receiver array 202 is transmitted over network 206 to server 208. While only one computation unit 204 is depicted, this is for convenience only; several computation units may be used in the environment of FIG. 2.

Network 206 may be any network, such as a local area network of environment 100, an ad hoc network, the Internet, or the like. Raw or processed signal data or image data may be transmitted over network 206 for processing by a processor of server 208. Server 208 may generate an image of environment 100 and the persons and products therein, and may additionally track data relating to those persons and products using memory. The components of server 208 are described below with reference to FIGS. 3-4.

Server Components

Figure 3:
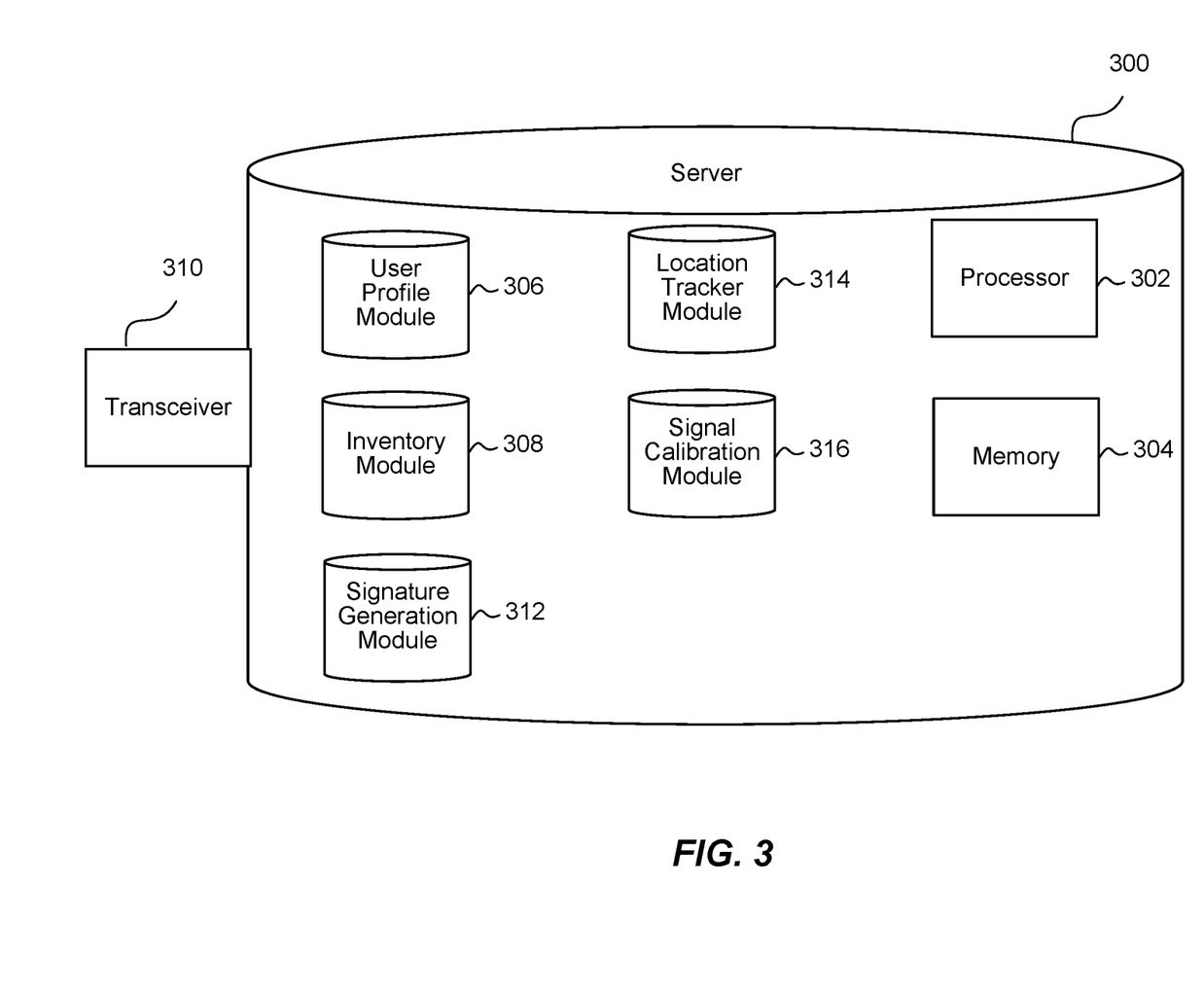
FIG. 3 illustrates one embodiment of a server used to process data derived from signal receivers for tracking persons and items.

FIG. 3 illustrates one embodiment of an example server used to process data derived from signal receivers for tracking persons and items. FIG. 3 depicts server 300, which may have the functionality of the server described with reference to FIG. 1, and which may also have the functionality of server 208 in FIG. 2. Server 300 may include one or more processors 302, which processes data in the manner described above with reference to FIG. 1 wherever mention is made of a processor of a server. The server 300 also may include other computing components, for example, as described with respect to FIG. 4. Server 300 also includes one or more memories 304, which may be any known form of memory (e.g., random access memory, etc., described further with respect to FIG. 4 below). While only one server is depicted with one processor block and one memory block, the functionality of server 300 may be distributed across multiple servers, each of which may have multiple processors or memory blocks to perform the functionality described herein. As is further described herein, the server 300 includes one or more modules. The modules may include program code (comprised of one or more instructions) corresponding to a particular functionality of a module. The modules may be stored in the memory 304. The modules may be executable by the server 302.

Additionally, server 300 may include various modules. User profile module 306 is used by processor 302 to manage user profile data. User profile data may be stored within server 300, or may be accessed by way of a database external to server 300 (e.g., by using transceiver 310). The user profile data includes identifying information of a user, including detectable unique characteristics, e.g., the unique digital signature of the user as determined by imaging environment 100, as discussed above. The user profile data may additionally include other identifying information of the user, such as information input by the user into a kiosk or app as discussed above. Further, the user profile data may include payment information (e.g., credit card information or payment account information) that processor 302 may use to charge a given user for any products 110 purchased by the user. Processor 302 may call on user profile module 306 to execute any update or retrieval of the user profile information in any manner disclosed herein.

Server 300 also may include inventory module 308. Inventory module 308 tracks information relating to products 110 of environment 100. The information may be unique characteristics of the products 110 that are trackable through the above-described imaging process, and may include additional information (e.g., symbol information for identifying a given product) as described above. Inventory module 308 may be used to update inventory data (stored, e.g., at memory 304 of server 300 or in a remote database) to indicate a purchase by a given user, and user profile data corresponding to that given user may also be updated by processor 302 (e.g., using user profile module 306) to also indicate the purchase.

Server 300 also may include signature generator module 312. Processor 302 may call on signature generator module 312 to generate a signature in any manner disclosed herein. Server 300 may additionally include location tracker module 314. Location tracker module 314 is configured to track location within an environment (e.g., environment 100) of one or more persons (e.g., person 112) and/or one or more products (e.g., products 110). Location tracker module 314 may call user profile module 306 to update a profile of a given person with a path of movement of the given person through environment 100. Additionally, server 300 may include signal calibration module 316, which may execute a protocol to calibrate transmitters 116 using reference receiver 108 in any manner described herein.

Computing Machine Architecture

Figure 4:
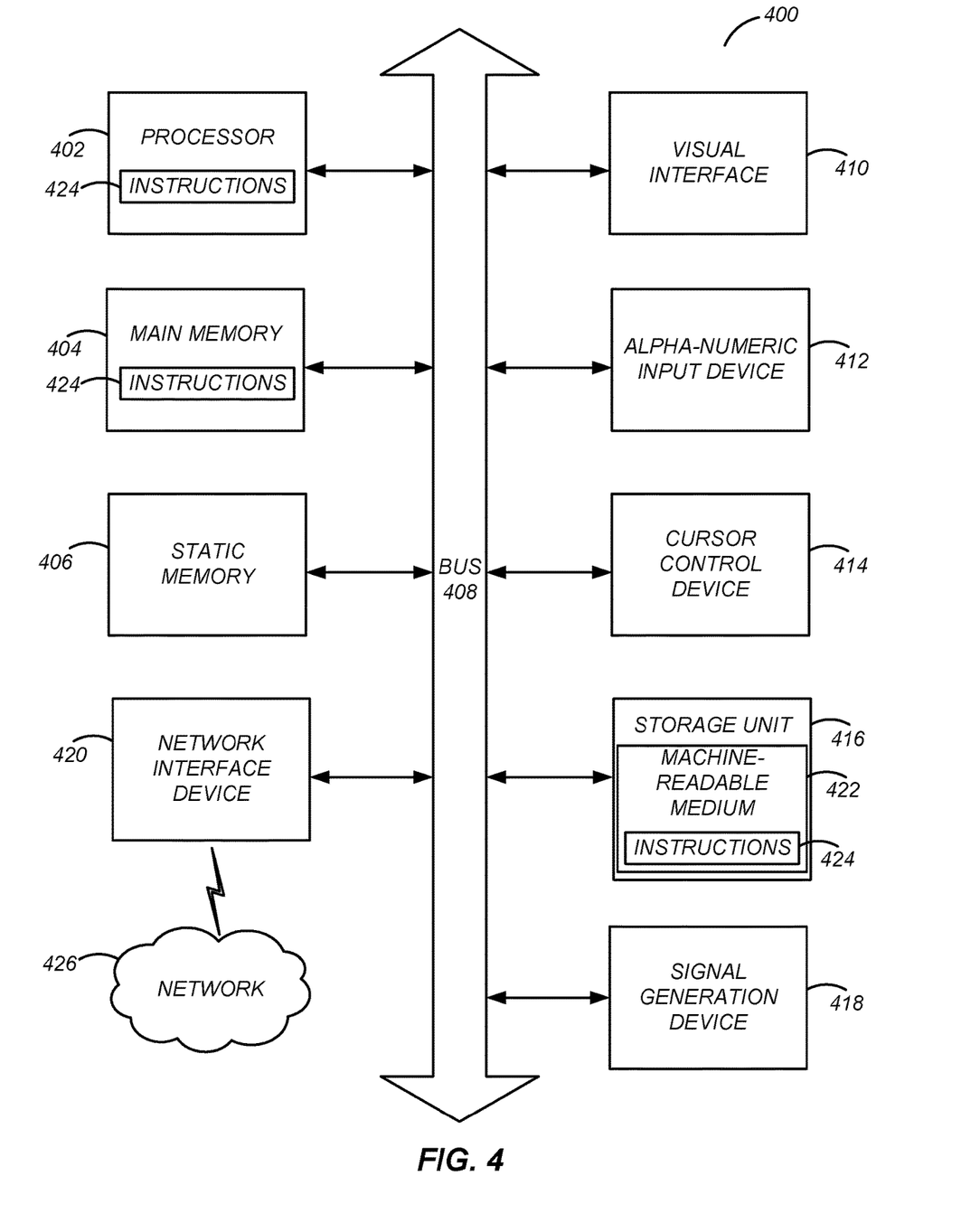
FIG. 4 is a block diagram illustrating components of an example machine able to read instructions from a machine-readable medium and execute them in a processor (or controller).

FIG. 4 is a block diagram illustrating components of an example machine able to read instructions from a machine-readable medium and execute them in a processor (or controller) (e.g., server 208, or a client device or kiosk as referenced above with respect to FIG. 1). Specifically, FIG. 4 shows a diagrammatic representation of a machine in the example form of a computer system 400 within which program code (e.g., software) for causing the machine to perform any one or more of the methodologies discussed herein may be executed. The program code may be comprised of instructions 424 executable by one or more processors 402. In alternative embodiments, the machine operates as a standalone device or may be connected (e.g., networked) to other machines. In a networked deployment, the machine may operate in the capacity of a server machine or a client machine in a server-client network environment, or as a peer machine in a peer-to-peer (or distributed) network environment.

The machine may be a server computer, a client computer, a personal computer (PC), a tablet PC, a set-top box (STB), a personal digital assistant (PDA), a cellular telephone, a smartphone, a web appliance, a network router, switch or bridge, or any machine capable of executing instructions 424 (sequential or otherwise) that specify actions to be taken by that machine. Further, while only a single machine is illustrated, the term "machine" shall also be taken to include any collection of machines that individually or jointly execute instructions 124 to perform any one or more of the methodologies discussed herein.

The example computer system 400 includes a processor 402 (e.g., a central processing unit (CPU), a graphics processing unit (GPU), a digital signal processor (DSP), one or more application specific integrated circuits (ASICs), one or more radio-frequency integrated circuits (RFICs), or any combination of these), a main memory 404, and a static memory 406, which are configured to communicate with each other via a bus 408. The computer system 400 may further include visual display interface 410. The visual interface may include a software driver that enables displaying user interfaces on a screen (or display). The visual interface may display user interfaces directly (e.g., on the screen) or indirectly on a surface, window, or the like (e.g., via a visual projection unit). For ease of discussion the visual interface may be described as a screen. The visual interface 410 may include or may interface with a touch enabled screen. The computer system 400 may also include alphanumeric input device 412 (e.g., a keyboard or touch screen keyboard), a cursor control device 414 (e.g., a mouse, a trackball, a joystick, a motion sensor, or other pointing instrument), a storage unit 416, a signal generation device 418 (e.g., a speaker), and a network interface device 420, which also are configured to communicate via the bus 408.

The storage unit 416 includes a machine-readable medium 422 on which is stored instructions 424 (e.g., software) embodying any one or more of the methodologies or functions described herein. The instructions 424 (e.g., software) may also reside, completely or at least partially, within the main memory 404 or within the processor 402 (e.g., within a processor's cache memory) during execution thereof by the computer system 400, the main memory 404 and the processor 402 also constituting machine-readable media. The instructions 424 (e.g., software) may be transmitted or received over a network 426 via the network interface device 420.

While machine-readable medium 422 is shown in an example embodiment to be a single medium, the term "machine-readable medium" should be taken to include a single medium or multiple media (e.g., a centralized or distributed database, or associated caches and servers) able to store instructions (e.g., instructions 424). The term "machine-readable medium" shall also be taken to include any medium that is capable of storing instructions (e.g., instructions 424) for execution by the machine and that cause the machine to perform any one or more of the methodologies disclosed herein. The term "machine-readable medium" includes, but not be limited to, data repositories in the form of solid-state memories, optical media, and magnetic media.

Exemplary Process 3D Localization and Imaging of Products and Customers

Figure 5:
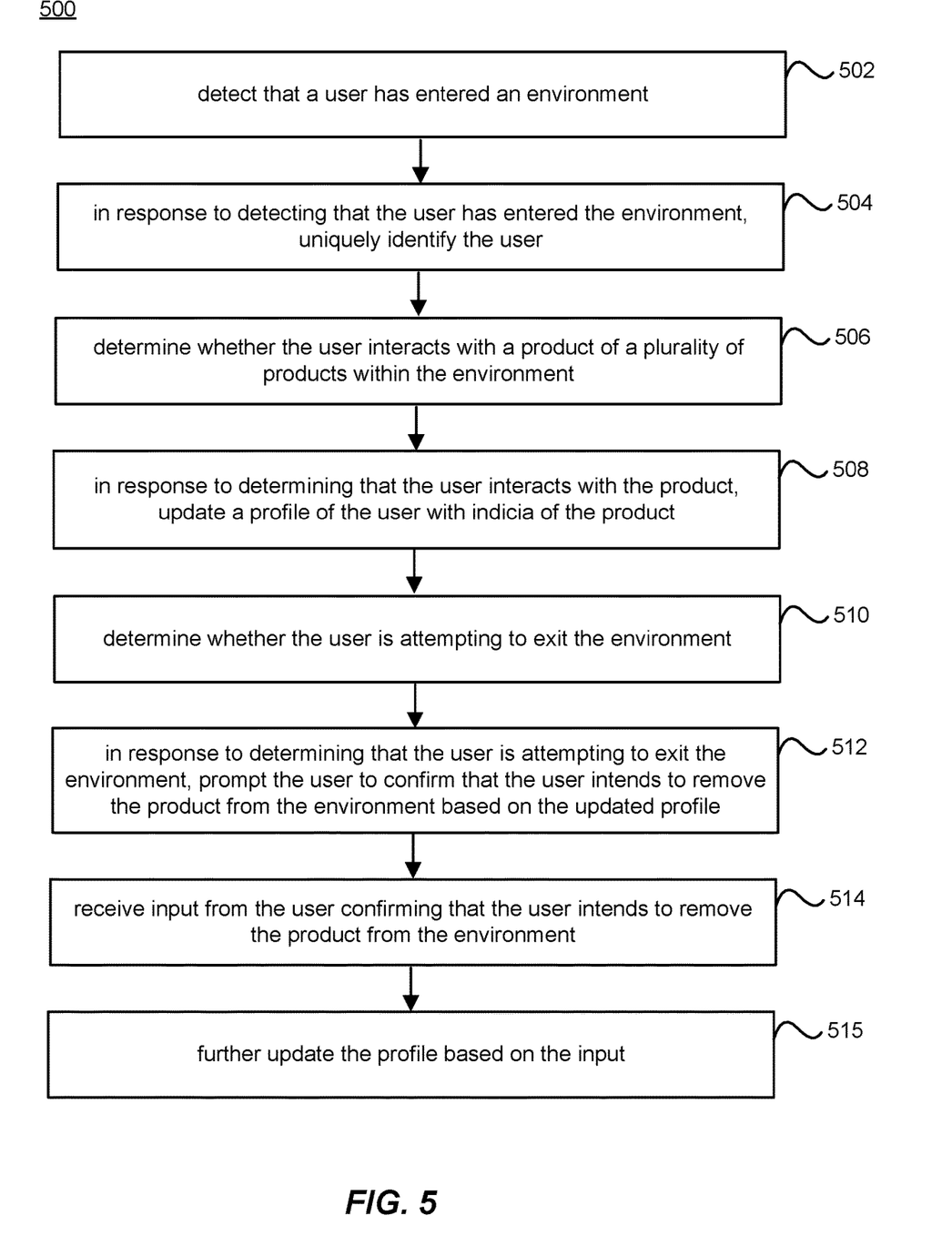
FIG. 5 is a flow chart illustrating an exemplary process for processing data derived from signal receivers for tracking persons and items.

FIG. 5 is a flow chart illustrating an exemplary process for processing data derived from signal receivers for tracking persons and items. The elements of process 500 may be run using a server (e.g., server 300), and may each be executed by various modules described herein. Process 500 begins with a processor (e.g., processor 302 of server 300) detecting 502 that a user (e.g., user 112) has entered an environment (e.g., environment 100). In response to detecting that the user has entered the environment, the processor uniquely identifies 504 the user (e.g., using signature generation module 312 to generate a unique signature, and mapping the unique signature to a known user profile using user profile module 306, or generating a new user profile if the user is unknown). The processor determines 506 whether the user interacts with a product of a plurality of products (e.g., a product of products 110). In response to determining that the user interacts with the product, the processor updates 508 a profile of the user with indicia of the product (e.g., by determining the indicia of the product using inventory module 308, and applying that indicia to the user profile using user profile module 306).

The processor determines 510 whether the user is attempting to exit the environment (e.g., by using location tracker module 314 to determine whether user 112 is approaching exit 104). In response to determining that the user is attempting to exit the environment, the processor prompts 512 the user to confirm that the user intends to remove the product from the environment based on the updated profile (e.g., by pushing a prompt to a mobile device of the user). The processor receives 514 input from the user confirming that the user intends to remove the product from the environment, and further updates 515 the profile based on the input (e.g., by attributing a sale of the product to the user profile). The processor may further adjust the inventory of products 110 to indicate that the product has been removed from environment 100 using inventory module 308.

Additional Configuration Considerations

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process for monitoring a user and products in an environment using signals that do not require a line of sight through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A method comprising:
    detecting that a user has entered an environment, by:
        receiving wireless network signals detected by a receiver array, the receiver array continuously monitoring for wireless network signals;
        determining a measure of absorption of a given waveform of the wireless network signals; and
        determining, based on inputting the measure of absorption into a data structure and receiving an output from the data structure, that the given waveform represents a human being;
    in response to detecting that the user has entered the environment, uniquely identifying the user based on signal patterns of the wireless network signals corresponding to at least two uniquely identifiable physical features of the user;
    determining whether the user interacts with a product of a plurality of products within the environment based on absorption characteristics of the product relative to the wireless network signals;
    in response to determining that the user interacts with the product, updating a profile of the user with indicia of the product;
    determining whether the user is attempting to exit the environment;
    in response to determining that the user is attempting to exit the environment, prompting the user to confirm that the user intends to remove the product from the environment based on the updated profile;
    receiving input from the user confirming that the user intends to remove the product from the environment; and
    further updating the profile based on the input.

2. The method of claim 1, wherein uniquely identifying the user comprises:
    detecting signal patterns corresponding to features of the user;
    generating a signature based on the signal patterns;
    determining whether the user is known by determining whether the unique signature matches a stored signature in an entry of a database that corresponds signatures to profiles of users; and
    responsive to determining that the user is known, attributing an identifier retrieved from the profile to the user.

3. The method of claim 2, wherein prompting the user to confirm that the user intends to remove the product from the environment based on the updated profile comprises:
    determining an address of a mobile device of the user from the profile; and pushing a notification to the mobile device, using the address, the notification comprising a selectable option to confirm that the user intends to remove the product from the environment.

4. The method of claim 2, further comprising:
responsive to determining that the user is not known:
adding the unique signature to an entry of the database;
associating an identifier to the entry of the database; and
uniquely identifying the user using the identifier.

5. The method of claim 1, wherein updating the profile with the indicia of the product comprises:
identifying patterns, by the product, of signals within the environment that are indicative of characteristics of objects encountered by the signals;
determining whether the patterns correspond to known patterns in one or more entries of a database that maps products to known patterns, the database entries indicating at least one of absorption characteristics, reflectivity characteristics, and refraction characteristics; and
responsive to determining that the patterns match an entry of the database, identifying the indicia of the product based on the entry.

6. The method of claim 5, further comprising:
determining that the patterns match two or more entries of the database;
responsive to determining that the patterns match two or more entries of the database, querying a sensor for a weight of the product;
determining whether one of the two or more entries of the database indicates a weight matching the weight of the product; and
responsive to determining that one of the two or more entries of the database indicates a weight matching a weight of the product, identifying the indicia of the product based on the one of the two or more entries.

7. The method of claim 5, wherein the patterns are absorption patterns, and wherein identifying the absorption patterns, by the product, of the signals within the environment comprises:
detecting a radio-opaque marker embedded on the product based on locations of the product having a high signal absorption rate, and wherein determining whether the absorption patterns correspond to known patterns in an entry of a database that maps products to known absorption patterns comprises:
determining whether an entry of the database maps a product to the detected radio-opaque marker.

8. A non-transitory computer-readable storage medium comprising stored instructions executable by at least one processor, the instructions when executed causing the at least one processor to:
detect that a user has entered an environment, by:
receiving wireless network signals detected by a receiver array, the receiver array continuously monitoring for wireless network signals;
determining a measure of absorption of a given waveform of the wireless network signals; and
determining, based on inputting the measure of absorption into a data structure and receiving an output from the data structure, that the given waveform represents a human being;
uniquely identify the user based on signal patterns of the wireless network signals corresponding to at least two uniquely identifiable physical features of the user, responsive to detection that the user has entered the environment;
determine whether the user interacts with a product of a plurality of products within the environment based on absorption characteristics of the product relative to the wireless network signals;
update a profile of the user with indicia of the product responsive to a determination that the user interacts with the product;
determine whether the user is attempting to exit the environment;
prompt the user to confirm that the user intends to remove the product from the environment based on the updated profile responsive to a determination that the user is attempting to exit the environment;
receive input from the user confirming that the user intends to remove the product from the environment; and
update the profile based on the received input.

9. The non-transitory computer-readable storage medium of claim 8, wherein the instructions to uniquely identify the user comprise further instructions that when executed cause the processor to:
detect signal patterns corresponding to features of the user;
generate a signature based on the signal patterns;
determine whether the user is known by determining whether the unique signature matches a stored signature in an entry of a database that corresponds signatures to profiles of users; and
attribute an identifier retrieved from the profile to the user responsive to a determination that the user is known.

10. The non-transitory computer-readable storage medium of claim 9, wherein the instructions to prompt the user to confirm that the user intends to remove the product from the environment based on the updated profile comprise further instructions that when executed cause the processor to:
determine an address of a mobile device of the user from the profile; and
push a notification to the mobile device, using the address, the notification comprising a selectable option to confirm that the user intends to remove the product from the environment.

11. The non-transitory computer-readable storage medium of claim 9, the instructions further comprising instructions that when executed cause the processor to, responsive to a determination that the user is not known:
add the unique signature to an entry of the database;
associate an identifier to the entry of the database; and
uniquely identify the user using the identifier.

12. The non-transitory computer-readable storage medium of claim 8, wherein the instructions to update the profile with the indicia of the product further comprise instructions that when executed cause the processor to:
identify patterns, by the product, of signals within the environment that are indicative of characteristics of objects encountered by the signals;
determine whether the patterns correspond to known patterns in one or more entries of a database that maps products to known absorption patterns; and
identify the indicia of the product based on the entry responsive to a determination that the patterns match an entry of the database.

13. The non-transitory computer-readable storage medium of claim 12, wherein the instructions further comprise instructions that when executed cause the processor to:
determine that the patterns match two or more entries of the database;

query a sensor for a weight of the product responsive to a determination that the patterns match two or more entries of the database;
determine whether one of the two or more entries of the database indicates a weight matching the weight of the product; and
identify the indicia of the product based on the one of the two or more entries responsive to a determination that one of the two or more entries of the database indicates a weight matching a weight of the product.

14. The non-transitory computer-readable storage medium of claim 12, wherein the patterns are absorption patterns, and wherein the instructions to identify the absorption patterns, by the product, of the signals within the environment further comprise instructions that when executed causes the processor to:
detect a radio-opaque marker embedded on the product based on locations of the product having a high signal absorption rate, and wherein the instructions to determine whether the absorption patterns correspond to known patterns in an entry of a database that maps products to known absorption patterns comprise instructions to:
determine whether an entry of the database maps a product to the detected radio-opaque marker.

15. A system comprising:
a processor configured to:
detect, using a sensor, that a user has entered an environment, by:
receiving wireless network signals detected by a receiver array, the receiver array continuously monitoring for wireless network signals;
determining a measure of absorption of a given waveform of the wireless network signals; and
determining, based on inputting the measure of absorption into a data structure and receiving an output from the data structure, that the given waveform represents a human being;
in response to detecting that the user has entered the environment, uniquely identify the user based on signal patterns of the wireless network signals corresponding to at least two uniquely identifiable physical features of the user using a signature generation module;
determine, using an inventory module, whether the user interacts with a product of a plurality of products within the environment based on absorption characteristics of the product relative to the wireless network signals;
in response to determining that the user interacts with the product, update, using a user profile module, a profile of the user with indicia of the product;
determine, using a location tracker module, whether the user is attempting to exit the environment;
in response to determining that the user is attempting to exit the environment, prompt the user to confirm that the user intends to remove the product from the environment based on the updated profile;
receive input from the user confirming that the user intends to remove the product from the environment; and
further update the profile, using the user profile module, based on the input.

16. The system of claim 15, wherein the processor is further configured, when being caused to uniquely identify the user, to:
detect signal patterns corresponding to features of the user;
generate a signature based on the signal patterns;
determine whether the user is known by determining whether the unique signature matches a stored signature in an entry of a database that corresponds signatures to profiles of users; and
responsive to determining that the user is known, attribute an identifier retrieved from the profile to the user.

17. The system of claim 16, wherein the processor is further configured, when being caused to prompt the user to confirm that the user intends to remove the product from the environment based on the updated profile, to:
determine an address of a mobile device of the user from the profile; and
push a notification to the mobile device, using the address, the notification comprising a selectable option to confirm that the user intends to remove the product from the environment.

18. The system of claim 16, wherein the processor is further configured to:
responsive to determining that the user is not known:
add the unique signature to an entry of the database;
associate an identifier to the entry of the database; and
uniquely identify the user using the identifier.

19. The system of claim 15, wherein the processor is further configured, when being caused to update the profile with the indicia of the product, to:
identify patterns, by the product, of signals within the environment that are indicative of characteristics of objects encountered by the signals;
determine whether the patterns correspond to known patterns in one or more entries of a database that maps products to known patterns, the database entries indicating at least one of absorption characteristics, reflectivity characteristics, and refraction characteristics; and
responsive to determining that the patterns match an entry of the database, identify the indicia of the product based on the entry.

20. The system of claim 19, wherein the processor is further configured to:
determine that the patterns match two or more entries of the database;
responsive to determining that the patterns match two or more entries of the database, query a sensor for a weight of the product;
determine whether one of the two or more entries of the database indicates a weight matching the weight of the product; and
responsive to determining that one of the two or more entries of the database indicates a weight matching a weight of the product, identify the indicia of the product based on the one of the two or more entries.

* * * * *